UNITED STATES PATENT OFFICE.

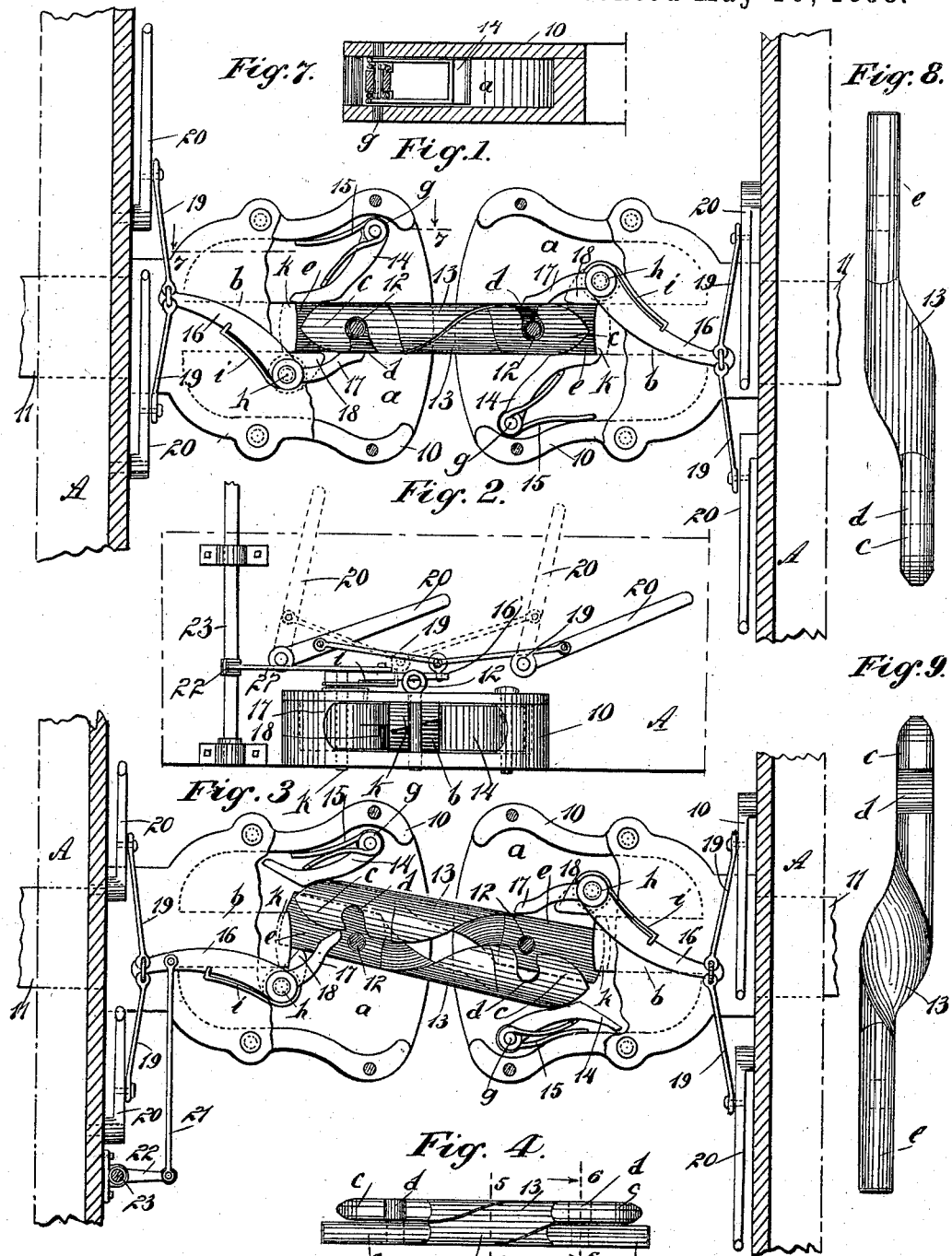

JAMES M. BROWN AND LEO D. PEAK, OF EXETER, ILLINOIS.

CAR-COUPLING.

SPECIFICATION forming part of Letters Patent No. 603,889, dated May 10, 1898.

Application filed August 25, 1897. Serial No. 649,458. (No model.)

*To all whom it may concern:*

Be it known that we, JAMES M. BROWN and LEO D. PEAK, of Exeter, in the county of Scott and State of Illinois, have invented a new and useful Improvement in Car-Couplings, of which the following is a full, clear, and exact description.

This invention relates to car-couplings of the link-and-pin type, and has for its object to provide a car-coupling of the indicated type with novel features of construction which adapt it for automatically coupling with a like coupling and also for convenient release in a safe manner, said coupling being also readily connectible with an ordinary car-coupling having a vertical coupling-pin.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a sectional plan view in part of two car-bodies having the improvements thereon shown in coupled condition. Fig. 2 is an end elevation of a car and the coupling thereon, the coupling-link being removed. Fig. 3 is a plan view similar to Fig. 1, but showing the coupling device adjusted to release the opposing car-couplings. Fig. 4 is a detached side view of the two-part coupling-link in interlocked condition. Fig. 5 is an enlarged transverse sectional view of the coupling-link on the line 5 5 in Fig. 4. Fig. 6 is an enlarged transverse sectional view on the line 6 6 in Fig. 4. Fig. 7 is a longitudinal sectional view of the draw-head substantially on the line 7 7 in Fig. 1, showing a spring-pressed arm pivotally held therein. Fig. 8 is an enlarged outer side view of the novel coupling-link, and Fig. 9 is an inner side view of the coupling-link.

In the drawings, which represent the invention, 10 indicates the coupling draw-head located at the forward end of the draw-bar 11, the latter being shown curtailed in length, but in complete form is adapted for attachment upon the lower side of the car-body A in any preferred manner.

The draw-head 10 is recessed to provide a suitable chamber $a$, which chamber is open at the front of the draw-head sufficiently for the free introduction and lateral movement therein of the coupling-link, as will hereinafter be fully described.

The draw-head may have its top and bottom walls formed integral with the side walls thereof or be provided with a detachable top wall, as indicated in the drawings.

At the transverse center of the draw-head 10 and a suitable distance from the front edges of the top and bottom walls of the same alined vertical perforations are formed in said walls for the reception of the coupling-pin 12, provided with a head, as shown in Fig. 2.

Within the chamber $a$, at its transverse center, an abutment-wall $b$ projects forwardly from the rear wall of the said chamber. The abutment-wall $b$ is of a proper breadth for effective service, as hereinafter explained, and may be parallel on the sides, as represented in Figs. 1 and 3.

The coupling-link 13, provided for connection of the draw-head 10 with a similar draw-head or with an ordinary car-coupling having a vertical coupling-pin, is clearly shown in Figs. 1, 3, 4, 8, and 9 and consists of an elongated bar of metal having two essentially flat portions, one at each end of the bar, and an integral intermediate portion, cylindriform on one side and of spiral or twisted conformation on the opposite side.

One end $c$ of the coupling-link 13 is laterally notched, as at $d$, for a hooked engagement with a coupling-pin on another car-coupling, which may be of the improved construction. The hooked end of the coupling-link 13 may be slightly convexed on the sides that are parallel at the transverse center thereof, and the edges in like manner are preferably rounded a suitable degree. Near the extremity of the hooked end $c$ said end is tapered to give it a blunt arrow-head shape, and the edges of the tapered portion may also be slightly curved in cross-section to remove the sharp corners. The other end $e$ of the coupling-link is nearly flat on opposite sides and at a proper distance from the notch $d$ is perforated to receive the coupling-pin 12, which when engaged with the link serves to loosely secure it within the chamber $a$ of the draw-head.

The intermediate portion of the coupling-link 13 is auger-twisted on the surface that is nearest the notched edge of the end $c$ and trends diagonally from the general plane of the said end to join the other end $e$, as clearly shown in Figs. 4, 8, and 9.

The degree of deviation had by the intermediate portion of the coupling-link 13 from the longitudinal planes of the end portions $c$ and $e$ is so proportioned as to aline the normally upper side of the end $e$ with the normally lower side of the opposite end $c$.

The thickness of the coupling-link near its longitudinal center, considered transversely thereof, permits the exterior surface of the intermediate portion to be rendered semicylindric, as is clearly shown in Fig. 5.

It will be seen from the foregoing description that if two of the improved coupling-links 13 are placed together, as shown in Figs. 1, 4, and 5, their intermediate portions will have their twisted sides impinged upon each other, and the exterior surfaces thereof will form a complete cylinder, the end $c$ of each coupling-link then engaging one side of the same with an upper side of the end $e$ of the other link.

In the chamber $a$ of the draw-head 10, near the front edges of the top and bottom walls thereof and adjacent to one side wall of the draw-head, a presser-limb 14 is pivoted on a pintle-bolt $g$, secured in the top and bottom of the draw-head. The presser-limb 14 is preferably bent, so as to project rearwardly and toward the abutment-wall $b$, whereon the end of said limb has contact when in normal adjustment.

A spring 15, preferably bent from a wire rod, is coiled upon the pintle-bolt $g$ above and below the edges of the presser-limb 14, said coils being located in rabbets cut in the presser-limb, as shown in Fig. 7. A looped portion of the spring 15 bears upon the presser-limb, and the ends of said spring press against the inner surface of the side wall of the draw-head, thus adapting the spring to hold the free extremity of the presser-limb in contact with the adjacent side of the abutment-wall $b$. At the opposite side of the abutment-wall $b$ and near its forward end a tripping-arm 16 is pivoted upon a pintle-bolt $h$, entering at its ends perforations formed in the upper and lower walls of the draw-head.

The hub of the arm 16 which is affixed to the pintle-bolt $h$ is spaced sufficiently from the upper wall of the draw-head 10 to permit the location of a coiled spring $i$ on the pintle-bolt, said spring occupying such intervening space, as shown in Fig. 2. One end of the spring $i$ is secured to the upper wall of the draw-head, and the other end extending as an arm presses upon the tripping-arm 16 at its outer edge, so as to normally rock the tripping-arm toward the presser-limb 14.

On the portion of the pintle-bolt $h$ within the chamber $a$ of the draw-head the hub end of a tripping-finger 17 is secured, so as to project forwardly and toward the coupling-pin 12 when the latter is in place.

The abutment-wall $b$ at the front end is undercut, thus producing an open recess below a forwardly-projecting lip $k$, the said recess being adapted to loosely receive the end $e$ of the coupling-link 13, said end $e$ extending rearwardly a sufficient distance from the coupling-pin 12 when held in the draw-head by said pin to permit its insertion below the lip.

The tripping-finger 17 is of such a relative thickness as will allow it to rock freely above the end $e$ of the coupling-link 13 when the arm 16 is rocked away from the abutment-wall $b$.

On the pintle-bolt $h$, below and preferably integral with the tripping-finger 17, a shorter tripping-finger 18 is likewise pivoted, this finger being directly opposite one edge of the end $e$ of the link 13.

The end of the tripping-arm 16 which projects toward the end wall of the car-body A is loosely connected by the link-rods 19 with rocking levers 20, pivoted upon the end wall of the car-body and suitably spaced apart, as shown in Figs. 1, 2, and 3. The tripping-arm 16 may also be loosely connected by the link-rod 21 with the rock-arm 22, projecting from the upright shaft 23, said shaft being held to rock on the end wall of the car and extends to or near the roof of the car, thereby affording means when rocked to vibrate the tripping-arm from the car-roof.

Assuming that two cars having the improvements are moved toward each other and each draw-head has a coupling-link 13 pivoted therein, so as to project outwardly, the weight of the levers 20 on each car-body A will cause said levers to lie considerably inclined, as shown by full lines in Fig. 2, and this will dispose the tripping-fingers 17 18, as shown in Fig. 1, thereby permitting the presser-limbs 14 to bear against the adjacent edges of the pivoted coupling-links 13, so as to aline them with the abutment-walls $b$. When the points of the ends $c$ of the links contact laterally with each other as the car-couplings approach, said ends of the coupling-links will slide one upon the other edgewise until the two links are entered a proper distance within the draw-head chambers $a$, and the notches $d$ of the links respectively receive the coupling-pins 12. At the instant the pins 12 enter the notches $d$ of the limbs 13 the twisted sides of the latter are pressed together by the limbs 14 and springs 15 thereon, so that the two coupling-links virtually become one link and effect a secure coupling together of the two draw-heads 10. The overhanging lip $k$ on the forward end of the abutment $b$ is preferably inclined on its lower side from a horizontal plane, as shown in Fig. 2. This inclination of the lower side of the lip $k$ permits the coupled end *e* of the link 13 to rock beneath the lip and rise slightly at the edge adjacent to the presser-limb 14. The slight edgewise rocking movement afforded to the two coupled links 13 prevents any cramping action and facilitates a free movement of the working parts of each coupling that have connection with each other.

To safely detach the coupled draw-heads and the two cars provided therewith, it is only necessary to raise either lever 20 on either of the cars. This movement of the rocking lever will draw the tripping-arm 16 into the position shown at the left in Fig. 3, which will cause the tripping-fingers 17 18 to rock toward the two links 13 and press upon their near edges. The finger 17 by its impinge on the end *c* of the upper link 13 forces said hooked portion out of engagement with the coupling-pin 12, and at the same time the tripping-finger 18 pushes the end *e* of the pivoted link away from the tripping-arm 16, and thus detaches the hooked end of said link from the coupling-pin 12 in the other draw-head.

To effect the uncoupling of two draw-heads requires but a limited rocking movement of the levers 20 upwardly—that is, not into a complete vertical position, as indicated by dotted lines in Fig. 2—the gravity of the levers still being disposed so that when released they will fall into the position shown by full lines in Fig. 2, the tension of the spring *i*, which has been under stress, aiding the return of the levers 20 and tripping-arms 16 to a normal position.

As before explained, the rock-shaft 23 may be utilized to rock the tripping-arm 16 by manipulating said shaft from the roof of the car, and thus release the car from another to which it is coupled.

It will be apparent that, if desired, the improved car-coupling may be coupled to an ordinary coupling of the link-and-pin type, so that cars having the herein-described improvements may be run on a road with other cars not provided therewith, thus facilitating the gradual adoption of the improved car-coupling on a railroad that previously employed the common style of link-and-pin coupling.

Having thus described our invention, we claim as new and desire to secure by Letters Patent—

1. A car-coupling, comprising a chambered draw-head, an elongated coupling-link having a laterally-hooked outer end, and a twist at the side rearward of the hook, said link being pivoted near its rear end at the rear of the draw-head chamber, a limb pivoted at the side of the coupling-link and spring-pressed thereon opposite from the hook, and means to rock the link laterally against the pressure of the said limb, as specified.

2. A car-coupling, comprising a chambered draw-head having an abutment-wall extending forwardly therein, a spring-pressed limb pivoted in the draw-head at one side of the abutment-wall and normally pressing thereon, a link having a hooked outer end and pivoted by the opposite end in the draw-head, the free end of the limb contacting with said link; a rockable tripping-arm spring-pressed toward the limb, and a finger actuated by the arm to laterally move the coupling-link on its pivot when said tripping-arm is rocked away from the pivoted limb, as specified.

3. A car-coupling comprising a chambered draw-head, a spring-pressed limb pivoted in said draw-head near one side thereof, a coupling-link having a hooked outer end and pivoted near the opposite end of the draw-head, said link having a twisted side intermediate of its ends, adapted to interlock with a like side on a similar link when the latter is inserted in the draw-head, and a rockable tripping-arm adapted to actuate a tripping-finger which will press on the coupling-link for its release from a coupling-pin when said arm is rocked, as specified.

4. In a car-coupling of the character described, a coupling-link comprising a bar flattened near each end, and notched at the side of one end to form a hook, the opposite end having a pivot-hole therein, and the ends of the links being held in parallel planes by a diagonally-disposed intermediate portion, said intermediate portion having one side twisted and the opposite side cylindric, as specified.

JAMES M. BROWN.
LEO D. PEAK.

Witnesses:
GEORGE N. BURKHOLTER,
HENRY CLAY WARD.